US011722607B2

(12) United States Patent
Saita

(10) Patent No.: US 11,722,607 B2
(45) Date of Patent: *Aug. 8, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Takayoshi Saita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 600 days.

This patent is subject to a terminal disclaimer.

(21) Appl. No.: 16/558,327

(22) Filed: Sep. 3, 2019

(65) Prior Publication Data

US 2020/0296234 A1 Sep. 17, 2020

(30) Foreign Application Priority Data

Mar. 12, 2019 (JP) ................................ 2019-044988

(51) Int. Cl.
*G06F 21/32* (2013.01)
*H04N 1/00* (2006.01)
(Continued)

(52) U.S. Cl.
CPC ......... *H04N 1/00342* (2013.01); *G06F 3/122* (2013.01); *G06F 3/1238* (2013.01);
(Continued)

(58) Field of Classification Search
CPC ............. H04N 1/00342; H04N 1/0048; H04N 1/00488; G06F 3/122; G06F 3/1238;
(Continued)

(56) References Cited

U.S. PATENT DOCUMENTS 7,711,961 B2 * 5/2010 Fujinuma ................ G06F 21/32
600/490
8,922,337 B2 * 12/2014 Fukushima ............. G06F 21/35
340/5.61

(Continued)

FOREIGN PATENT DOCUMENTS

| JP | 2005071225 | 3/2005 |
|---|---|---|
| JP | 2011223499 | 11/2011 |
| JP | 2016211157 | 12/2016 |

OTHER PUBLICATIONS

"Office Action of Japan Counterpart Application" with English translation thereof, dated Nov. 29, 2022, p. 1-p. 5.

*Primary Examiner* — Khalid M Almaghayreh
(74) *Attorney, Agent, or Firm* — JCIPRNET

(57) ABSTRACT

An information processing apparatus comprising a processor executing a control program configured to authenticate a user. The processor further configured to transmit an action instructing signal for issuing an instruction to perform an action to a portable device at plural radio wave output intensities selectively, via wireless communication, wherein the portable device has been associated with the user in advance. The processor further configured to detect a status change of the portable device, for at least one of the plural radio wave output intensities. The processor further configured to determine, when the action instruction signal is transmitted at the at least one of the plural radio wave output intensities and based on the change of the status corresponds to the action instructed by the action instruction signal, whether or not the user is holding the portable device that is associated with the user in advance.

17 Claims, 16 Drawing Sheets

(51) Int. Cl.
    *G06F 3/12*    (2006.01)
    *G06F 21/35*   (2013.01)
(52) U.S. Cl.
    CPC .............. *G06F 21/32* (2013.01); *G06F 21/35* (2013.01); *H04N 1/0048* (2013.01); *H04N 1/00488* (2013.01)
(58) Field of Classification Search
    CPC ........ G06F 21/32; G06F 21/35; G06F 3/1222; G06F 3/129; G06F 3/1292
    See application file for complete search history.

(56) References Cited

U.S. PATENT DOCUMENTS

| | | | |
|---|---|---|---|
| 10,645,243 B2 * | 5/2020 | Yokoyama | H04N 1/00891 |
| 2008/0215273 A1 * | 9/2008 | Lambert | G07D 7/0043 |
| | | | 702/82 |
| 2015/0135310 A1 * | 5/2015 | Lee | H04W 12/065 |
| | | | 726/20 |
| 2015/0212722 A1 * | 7/2015 | Leung | G06F 3/016 |
| | | | 726/19 |
| 2016/0154952 A1 * | 6/2016 | Venkatraman | G06Q 20/40145 |
| | | | 726/19 |
| 2016/0352939 A1 * | 12/2016 | Saito | H04N 1/00493 |
| 2017/0004296 A1 * | 1/2017 | Toiyama | G06F 21/32 |
| 2017/0103647 A1 * | 4/2017 | Davis | H04W 12/068 |
| 2017/0129456 A1 * | 5/2017 | Miyazawa | H04B 1/38 |
| 2017/0257363 A1 * | 9/2017 | Franke | H04W 12/069 |
| 2017/0359776 A1 * | 12/2017 | Matsuhara | H04W 48/12 |
| 2018/0276924 A1 * | 9/2018 | Hayashi | G08C 25/02 |
| 2020/0031616 A1 * | 1/2020 | Li | B66B 1/468 |
| 2021/0321223 A1 * | 10/2021 | Adachi | H04W 12/069 |

\* cited by examiner

FIG. 2

| USER ID | USER NAME | DEVICE ID |
|---------|-----------|-----------|
| 10012345 | TARO SUZUKI | 0078591 |
| 10012346 | JIRO YAMADA | 0043428 |
| 10012347 | TARO FUJI | 0010323 |
| 10012348 | HANAKO FUJI | 0076224 |

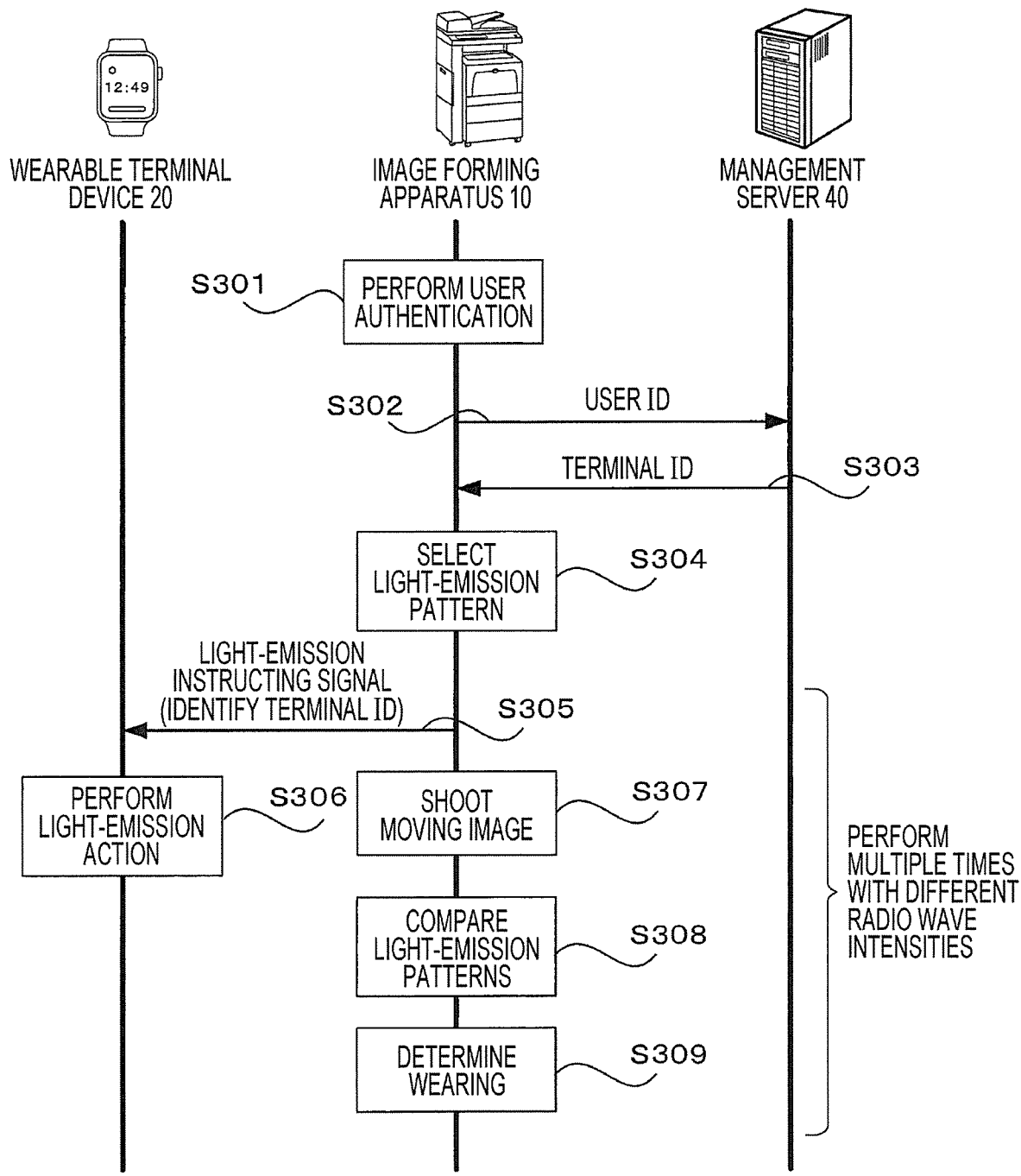

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-044988 filed Mar. 12, 2019.

BACKGROUND

(i) Technical Field

The present disclosure relates to an information processing apparatus and a non-transitory computer readable medium.

(ii) Related Art

In Japanese Unexamined Patent Application Publication No. 2005-071225, an electronic apparatus that detects bio-information indicating physical characteristics of a user to perform personal authentication and an authentication method are disclosed.

SUMMARY

Aspects of non-limiting embodiments of the present disclosure relate to providing an information processing apparatus that is capable of determining, in executing authentication of a user, whether or not the user is holding a portable device that is associated with the user with high accuracy compared to a case where an action instructing signal is transmitted using radio waves at a fixed radio wave output intensity, and a non-transitory computer readable medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an authenticating unit, a transmitting unit, a detecting unit, and a determining unit. The authenticating unit authenticates a user who is holding a portable device. The transmitting unit transmits an action instructing signal for issuing an instruction to perform an action to a portable device that is associated with the user at plural radio wave output intensities selectively, via a radio communication line. The detecting unit detects, for at least one of the plural radio wave output intensities, a change of a status of the portable device that is being held by the user. The determining unit determines, when the action instruction signal is transmitted at the at least one of the plural radio wave output intensities, by determining whether or not the change corresponds to the action instructed by the action instruction signal, whether or not the user is holding the portable device that is associated with the authenticated user.

BRIEF DESCRIPTION OF THE DRAWINGS

Exemplary embodiments of the present disclosure will be described in detail based on the following figures, wherein:

FIG. 2 is a diagram illustrating an example of a user ID management table stored in a management server;

FIG. 16 is a sequence chart for explaining an operation for performing a determination, based on a light-emission pattern, as to wearing of a wearable terminal device.

DETAILED DESCRIPTION

Exemplary embodiments of the present disclosure will be explained in detail with reference to drawings.

Figure 1:
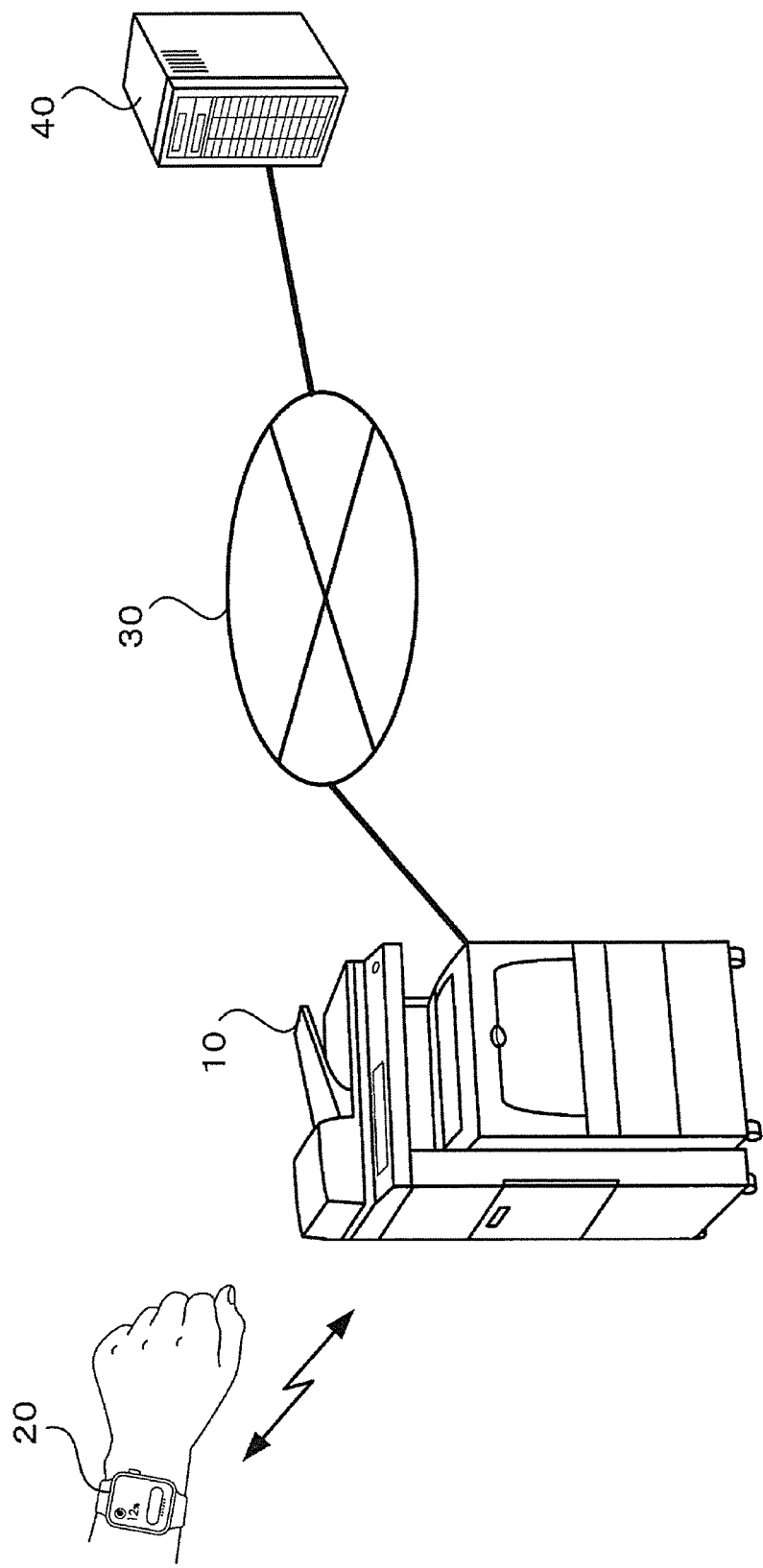
FIG. 1 is a diagram illustrating a system configuration of an information processing system according to an exemplary embodiment of the present disclosure.

FIG. 1 is a diagram illustrating a system configuration of an information processing system according to an exemplary embodiment of the present disclosure.

An information processing system according to an exemplary embodiment of the present disclosure includes, as illustrated in FIG. 1, an image forming apparatus 10, a wearable terminal device 20 that is being worn on an arm of a user, and a management server 40.

The image forming apparatus 10 and the management server 40 are connected via the Internet 30. Furthermore, the image forming apparatus 10 and the wearable terminal device 20 are connected via a short-range radio communication line such as a Bluetooth® low energy (BLE) line or the like.

The image forming apparatus 10 is an apparatus that is a so-called multifunction apparatus including a plurality of functions such as a print function, a scan function, a copy function, a facsimile function, and the like.

The wearable terminal device 20 includes various sensors and is used by being worn on an arm of a user. The wearable terminal device 20 includes a function for obtaining various types of sensor information including bio-information such as pulse rate, blood pressure, and the like, positional information, and the like of a user.

The image forming apparatus 10 functions as a gateway apparatus that acquires sensor information obtained by the wearable terminal device 20 and transfers the sensor information to the management server 40 via the Internet 30.

In FIG. 1, only one wearable terminal device 20 is illustrated. In actuality, however, a large number of wearable terminal devices 20 exist, and each of the wearable terminal devices 20 is associated with a user by whom it is supposed to be worn.

Different terminal IDs are allocated to the wearable terminal devices 20. The image forming apparatus 10 transfers sensor information acquired from the wearable terminal devices 20, along with the terminal IDs of the wearable terminal devices 20, to the management server 40.

The management server 40 manages each user based on a user ID of the user, and stores a user ID management table, as illustrated in FIG. 2. Thus, the management server 40 identifies a user ID that is associated with a terminal ID transferred along with sensor information from the image forming apparatus 10. The management server 40 stores, as user information of the identified user ID, sensor information transferred from the image forming apparatus 10.

An example of the user ID management table stored in the management server 40 is illustrated in FIG. 2. As is clear from the user ID management table illustrated in FIG. 2, a user ID, a user name, and a device ID are associated with one another. When a user ID is transmitted from the image forming apparatus 10 to the management server 40, the management server 40 transmits a device ID corresponding to the transmitted user ID to the image forming apparatus 10. The user ID management table may be held in advance in a gateway apparatus (in this exemplary embodiment, the image forming apparatus 10).

The sensor information acquired as described above is then analyzed, so that the health status and actions of individual users may be evaluated. Accordingly, such sensor information is used as information for management of health statuses and reforming of operational processes.

By installing such image forming apparatuses 10 in various places in an office, sensor information of a large number of users may be obtained and collected in the management server 40.

However, if a user wrongly wears a wearable terminal device 20 that is associated with a different user, sensor information of the user is recorded as sensor information of the different user who is associated with the wearable terminal device 20 that is being worn by the user. Furthermore, a malicious user may wear a wearable terminal device 20 of a different user on purpose.

In such a situation, sensor information stored in the management server 40 is not correct, and therefore, management of health statuses and reforming of operational processes may not be properly performed.

Thus, in the information processing system according to this exemplary embodiment, it is determined whether or not a user is wearing a correct wearable terminal device 20 that is associated with the user as the device supposed to be held by the user.

Figure 3:
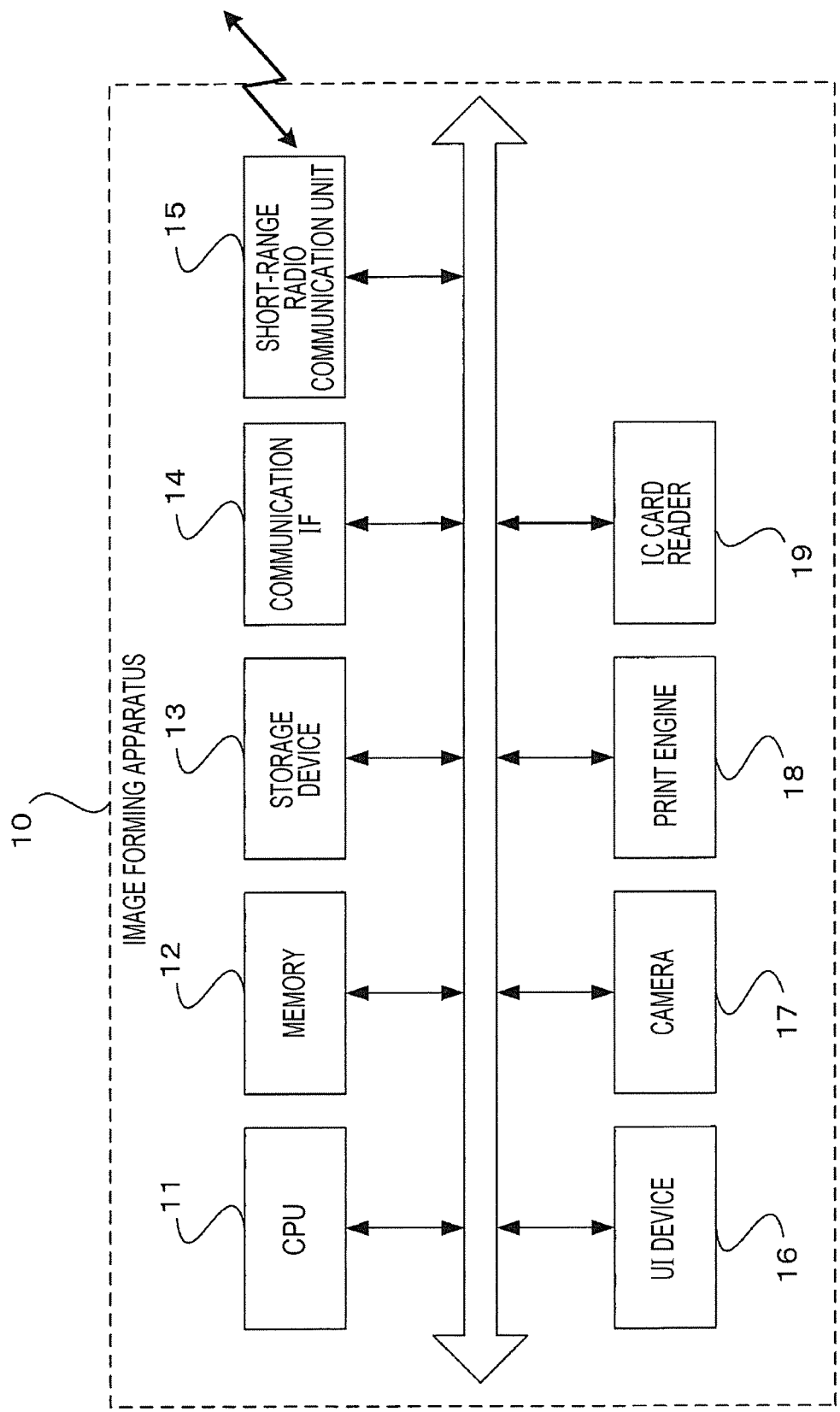
FIG. 3 is a block diagram illustrating a hardware configuration of an image forming apparatus according to an exemplary embodiment of the present disclosure.

FIG. 3 illustrates a hardware configuration of the image forming apparatus 10 in the information processing system according to this exemplary embodiment.

The image forming apparatus 10 includes, as illustrated in FIG. 3, a central processing unit (CPU) 11, a memory 12, a storage device 13 such as a hard disk drive, a communication interface (abbreviated as an IF) 14 for performing communication with an external apparatus via the Internet 30, a short-range radio communication unit 15 that performs short-range radio communication such as BLE, a user interface (abbreviated as UI) 16 that includes a touch panel or a liquid crystal display and a keyboard, a camera 17, a print engine 18, and an IC card reader 19.

The CPU 11 performs predetermined processing based on a control program stored in the memory 12 or the storage device 13, and controls an action of the image forming apparatus 10. In this exemplary embodiment, the CPU 11 is explained as a unit that reads and executes the control program stored in the memory 12 or the storage device 13. However, the program may be stored in a recording medium such as a compact disc-read only memory (CD-ROM) and supplied to the CPU 11.

Figure 4:
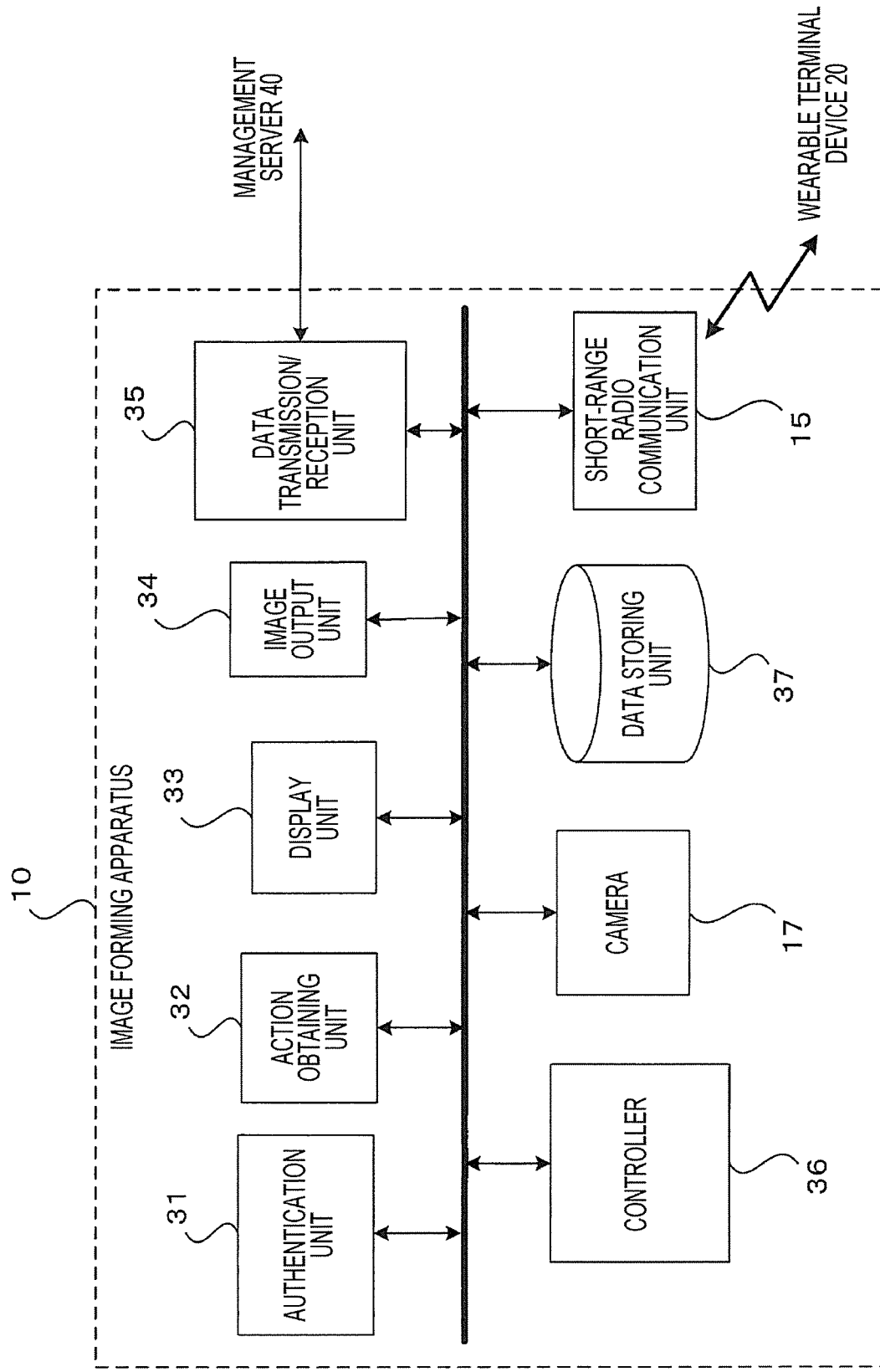
FIG. 4 is a block diagram illustrating a functional configuration of an image forming apparatus according to an exemplary embodiment of the present disclosure.

FIG. 4 is a block diagram illustrating a functional configuration of the image forming apparatus 10 that is implemented when the above-mentioned control program is executed.

The image forming apparatus 10 according to this exemplary embodiment includes, as illustrated in FIG. 4, an authenticating unit 31, an action obtaining unit 32, a display unit 33, an image output unit 34, a data transmission/reception unit 35, a controller 36, the camera 17, a data storing unit 37, and the short-range radio communication unit 15.

The authenticating unit 31 authenticates a user who is wearing the wearable terminal device 20. For example, when a user holds an IC card over the IC card reader, the authenticating unit 31 reads a user ID recorded in the IC card by short-range radio communication means (for example, radio frequency identification (RFID)) different from the short-range radio communication unit 15 and identifies the user. Accordingly, the authenticating unit 31 performs authentication. The authenticating unit 31 may authenticate a user by confirming a user ID and a password input by the user.

The display unit 33 displays various types of information for a user, under the control of the controller 36. The action obtaining unit 32 obtains information of various actions performed by a user. The display unit 33 and the action obtaining unit 32 may be integrated together as a graphical interface.

The image output unit 34 outputs an image onto a recording medium such as printing paper, under the control of the controller 36.

The data transmission/reception unit 35 transmits and receives data to and from an external apparatus via a network such as the Internet 30. For example, the data transmission/reception unit 35 transmits various types of information including sensor information acquired from the wearable terminal device 20 to the management server 40 via the Internet 30.

The camera 17 shoots a static image or a moving image including at least part of the body of a user and the wearable terminal device 20 that is being worn by the user.

The data storing unit 37 temporarily stores sensor information acquired from the wearable terminal device 20 and stores various data such as print data generated by the controller 36.

The short-range radio communication unit 15 receives sensor information from the wearable terminal device 20 via the BLE communication line and transmits various action instructing signals such as light-emission instructing signals to the wearable terminal device 20. A radio communication line or the like such as Wi-Fi® as well as the BLE communication line may be used as the short-range radio communication line.

By adjusting the intensity of output of radio waves, the communication line for the short-range radio communication unit 15 is able to transmit a light-emission instructing signal only to the wearable terminal device 20 that is being worn on an arm of a user within, for example, 1 meter, from the image forming apparatus 10 or transmit a light-emission instructing signal only to the wearable terminal device 20 that is being worn on an arm of a user within 10 meters from the image forming apparatus 10. That is, by adjusting the radio wave output intensity, a range from the image forming apparatus 10 that a light-emission instructing signal is able to reach may be set.

The controller 36 controls operations of other components of the image forming apparatus 10. For example, when a user who wishes to use the image forming apparatus 10 is authenticated by the authenticating unit 31, the controller 36 performs various operations such as copying, printing, and facsimile transmission and reception, in response to various operations from the authenticated user.

When the user is authenticated by the authenticating unit 31, the controller 36 identifies a terminal ID, which is identification information of the wearable terminal device 20 that is associated with the user authenticated by the authenticating unit 31. Specifically, the controller 36 transmits the user ID of the user authenticated by the authenticating unit 31 to the management server 40, and thus acquires a terminal ID associated with the user ID from the management server 40.

The controller 36 causes the short-range radio communication unit 15 to transmit an action instructing signal for issuing an instruction to perform an action to a portable device with the identified terminal ID, via the BLE communication line, which is a short-distance radio communication line.

Specifically, the controller 36 transmits a light-emission instructing signal indicating the identified terminal ID to the wearable terminal device 20, so that an action instruction for instructing a light-emission unit of the wearable terminal device 20 to emit light in a light-emission pattern randomly selected from among a plurality of light-emission patterns set in advance is transmitted to the wearable terminal device 20.

As described above, instead of a fixed light-emission pattern, a light-emission pattern that is difficult to be predicted by a user is used. Therefore, even if a user who is not wearing the correct wearable terminal device 20 tries to reproduce a light-emission pattern by different means on purpose so that an incorrect determination may be performed, it is difficult to cause such an incorrect determination.

The controller 36 of the image forming apparatus 10 according to this exemplary embodiment transmits light-emission instructing signals at different radio wave output intensities to the wearable terminal device 20, instead of transmitting light-emission instructing signals at the same radio wave output intensity.

For example, after user is authenticated by the authenticating unit 31, the controller 36 first transmits a light-emission instructing signal at a first radio wave output intensity. In the case where a change of the status of the wearable terminal device 20 is not detected based on a moving image shot by the camera 17, the controller 36 transmits a light-emission instructing signal at a second radio wave output intensity that is stronger than the first radio wave output intensity to the wearable terminal device 20.

Light-emission instructing signals are transmitted at different radio wave output intensities as described above because, if a light-emission instructing signal is transmitted at a strong radio wave output intensity from the beginning, the light-emission instructing signal may reach the wearable terminal device 20 that is being worn by a user who is located a little away from the image forming apparatus 10 as well as the wearable terminal device 20 that is being worn by a user who is using the image forming apparatus 10.

In such a case, although the authenticated user who wishes to use the image forming apparatus 10 is not wearing the wearable terminal device 20 that is associated with the user, if a different user who is wearing the wearable terminal device 20 that is supposed to be worn by the authenticated user is located a little away from the image forming apparatus 10, the light-emission instructing signal also reaches the wearable terminal device 20 that is being worn by the different user. If a change of the status of the wearable terminal device 20 that is being worn by the different user is shot by the camera 17, although the authenticated used is not wearing the wearable terminal device 20 that is associated with the authenticated user, an incorrect determination result that the authenticated user is wearing the correct wearable terminal device 20 that is associated with the authenticated user is obtained.

Furthermore, after a user is authenticated by the authenticating unit 31, the controller 36 may first transmit a light-emission instructing signal at a first radio wave output intensity. In the case where a change of the status of the wearable terminal device 20 is not detected based on a moving image shot by the camera 17 and a preset time has passed since authentication of the user by the authenticating unit 31, the controller 36 may transmit a light-emission instructing signal at a second radio wave output intensity that is stronger than the first radio wave output intensity to the wearable terminal device 20.

The radio wave output intensity is increased with time as described above because, by causing a light-emission instructing signal to reach the wearable terminal device 20 that is being worn by the authenticated user in the case where the authenticated user has been away from the image forming apparatus 10, a wearing determination as to whether or not the user is wearing the correct wearable terminal device 20 that is associated with the user may be performed.

In contrast, after a user is authenticated by the authenticating unit 31, the controller 36 may first transmit a light-emission instructing signal at a first radio wave output intensity. In the case where a change of the status of the wearable terminal device 20 is not detected based on a moving image shot by the camera 17, the controller 36 may transmit a light-emission instructing signal at a second radio wave output intensity that is weaker than the first radio wave output intensity.

For example, even in the case where light emission of the wearable terminal device 20 is detected by transmission of a light-emission instructing signal at a strong radio wave output intensity, the user who is wearing the wearable terminal device 20 may be away from the image forming apparatus 10, and the user who is wearing the wearable terminal device 20 may be different from an authenticated user. Thus, in the case where the controller 36 transmits a light-emission instructing signal at a weak radio wave output intensity and the wearable terminal device 20 whose light emission is detected when the light-emission instructing signal at the strong radio wave output intensity is transmitted does not respond to the light-emission instructing signal transmitted at the weak radio wave output intensity, it may be determined that the wearable terminal device 20 may not be wearing by the authenticated user.

As described above, the controller 36 transmits light-emission instructing signals at different radio wave output intensities selectively, and determines, by determining whether or not light emission of the wearable terminal device 20 is able to be detected based on the light-emission instructing signals at the different radio wave output intensities, whether or not the wearable terminal device 20 that is being worn by the user is the wearable terminal device 20 that is associated with the user.

The controller 36 detects a change of the status of the wearable terminal device 20 that is being worn by the user authenticated by the authenticating unit 31 from a moving image that is shot by the camera 17. Specifically, the controller 36 shoots, with the camera 17, a moving image including the wearable terminal device 20 that is being worn by the user authenticated by the authenticating unit 31, and thus detects the light-emission pattern of the wearable terminal device 20.

Alternatively, the controller 36 may cause the display unit 33 to display a message "Please press the button in synchronization with flashing of light." and allow the user to press a specific button in synchronization with the light-emission pattern of the wearable terminal device 20, so that a state in which the user is wearing the wearable terminal device 20 associated with the user may be confirmed.

In the case where the wearable terminal device 20 continuously obtains bio-information such as the pulse rate of a user, the controller 36 may determine that the correct wearable terminal device 20 continues to be worn, by confirming that bio-information is continuously detected without interruption from a point in time when the state in which the user is wearing the associated wearable terminal device 20 is confirmed.

Finally, the controller 36 compares the detected change of the status of the wearable terminal device 20 with contents of an action instructed by transmitting an action instructing signal and determines whether or not the wearable terminal device 20 associated with the user authenticated by the authenticating unit 31 is being worn.

Specifically, in the case where it is evaluated that a light-emission pattern obtained from a moving image that is shot by the camera 17 and a light-emission pattern instructed by transmitting a light-emission instructing signal match, the controller 36 determines that the user authenticated by the authenticating unit 31 is wearing the correct wearable terminal device 20 that is supposed to be worn by the user.

In the case where light-emission instructing signals are transmitted at different radio wave output intensities selectively as described above, the controller 36 determines that the user authenticated by the authenticating unit 31 is wearing the wearable terminal device 20 associated with the authenticated user when a light-emission instructing signal is transmitted at one of the plurality of radio wave output intensities and it is evaluated that a detected light-emission pattern of the wearable terminal device 20 and a light-emission pattern instructed by transmission of the light-emission instructing signal match.

In contrast, in the case where it is not evaluated that the light-emission pattern obtained from the moving image that is shot by the camera 17 and the light-emission pattern instructed by transmitting the light-emission instructing signal match, the controller 36 determines that the user authenticated by the authenticating unit 31 is not wearing the correct wearable terminal device 20 that is supposed to be worn by the user, that is, the authenticated user is wearing the wrong wearable terminal device 20 that is associated with another user.

In this exemplary embodiment, the wearable terminal device 20 is caused to emit light in a predetermined light-emission pattern in accordance with a light-emission instructing signal transmitted from the image forming apparatus 10 to the wearable terminal device 20. However, the image forming apparatus 10 may instruct the wearable terminal device 20 to perform an action involving a visual change, and the camera 17 may detect the visual change of the wearable terminal device 20 as a change of the status of the wearable terminal device 20.

For example, an action instructing signal may be transmitted to the wearable terminal device 20, so that the color or shape of the wearable terminal device 20 may be changed or an image of a specific letter, number, sign, emoticon, stamp, or the like or a combination of these images may be displayed on the display of the wearable terminal device 20.

In the case where an image of a specific letter, number, sign, emoticon, stamp, or the like or a combination of these images is displayed on the display of the wearable terminal device 20, the letter or the like may be detected by shooting the letter or the like by the camera 17. The size, color, display period, number of display times, number of displayed images, display interval, display pattern, or the like of a combination of images of a letter, number, sign, emoticon, stamp, and the like may be changed such that a user is not able to predict or copy easily when confirmation of wearing of the wearable terminal device 20 is performed. Alternatively, as means for confirming display contents on the display, instead of shooting by the camera 17 or by combining with shooting by the camera, a user who is wearing the wearable terminal device 20 may input displayed letter information using the action obtaining unit 32, so that letter information displayed on the wearable terminal device 20 may be detected based on the input letter information.

Furthermore, instead of causing the wearable terminal device 20 to generate a visual change, a status change in which sound is output from the wearable terminal device 20 may be generated so that the status change may be detected by a sound detection device of the image forming apparatus 10. Specifically, the image forming apparatus 10 may include a microphone for detecting sound. A sound output instructing signal may be transmitted from the controller 36 to the wearable terminal device 20 to instruct the wearable terminal device 20 to perform an action for outputting sound, and output sound may be detected by the microphone.

The controller 36 detects sound output from the wearable terminal device 20 to detect an auditory change of the wearable terminal device 20. Accordingly, the controller 36 determines whether or not the authenticated user is wearing the wearable terminal device 20 that is supposed to be worn by the user.

Furthermore, the image forming apparatus 10 may transmit an action instructing signal to the wearable terminal device 20 to cause a tactile change of the wearable terminal device 20, for example, generate vibrations, so that the tactile change may be detected. Furthermore, the user may be instructed to operate a specific button of the image forming apparatus 10 in accordance with start or stop of vibrations of the wearable terminal device 20. When the user operates the specific button, start or stop of vibrations of the wearable terminal device 20 may be detected.

Furthermore, the image forming apparatus 10 may include a receiver that receives a radio signal transmitted from the wearable terminal device 20. When the image forming apparatus 10 transmits to the wearable terminal device 20 an action instructing signal for instructing an action for transmitting a radio signal of a specific frequency and receives the radio signal of the specific frequency transmitted from the wearable terminal device 20, a change of the status of the wearable terminal device 20 may be detected.

In the case where it is determined that the user authenticated by the authenticating unit 31 is not wearing the wearable terminal device 20 that is associated with the authenticated user, the controller 36 notifies a specific notification destination that the authenticated user is not wearing the associated wearable terminal device 20.

Specifically, the controller 36 may provide notification by displaying information indicating that the correct wearable terminal device 20 is not being worn on the display unit 33 of the image forming apparatus 10. Alternatively, the controller 36 may notify a specific notification destination of information indicating that there is a user who is not properly wearing the wearable terminal device 20 that is set to be worn and a user ID of the user in association with each other, using information such as an e-mail address or the like set in advance. The notification destination may be, for example, an e-mail address of the user who is wearing the current wearable terminal device 20 and is authenticated by the authenticating unit 31. Furthermore, the notification destination may be an e-mail address of a user who is associated with the wearable terminal device 20 in the user ID management table, an e-mail address of an administrator who manages the system, or the like.

Furthermore, a notification indicating that it is determined that the authenticated user is not wearing the wearable terminal device 20 that is associated with the authenticated user may be transmitted to the management server 40 as a notification destination. A notification indicating that an authenticated user is wearing the wearable terminal device 20 that is associated with the authenticated user may be transmitted to a notification destination.

Furthermore, information indicating that a device is being worn and/or is not being worn may be notified, along with time information of the time at which the wearing state is determined and information of identifying the gateway apparatus (in this example, the image forming apparatus 10) that has performed user authentication, to the notification destination. By notifying the information indicating that a device is being worn/is not being worn, the determination time information, and the information of identifying the gateway apparatus that has performed user authentication at the same time and storing the above information in the management server 40 or the like, the gateway apparatus that has confirmed whether or not the wearable terminal device 20 is being worn may be identified chronologically. In the case where the wearable terminal device 20 includes a position measurement sensor (global positioning system (GPS)), detected positional information may be notified to the management server 40 or the like.

In the case where the authenticated user is not wearing the wearable terminal device 20 that is associated with the authenticated user, the controller 36 may dispose of the sensor information acquired from the wearable terminal device 20 as invalid sensor information so that the sensor information is not transferred to the management server 40 or may be transferred to the management server 40 along with information indicating that the sensor information is not correct sensor information.

Furthermore, in the case where the authenticated user is wearing the wearable terminal device 20 that is associated with the authenticated user, the controller 36 performs processing by regarding the sensor information transmitted from the wearable terminal device 20 as valid sensor information. Specifically, in the case where the authenticated user is wearing the wearable terminal device 20 that is associated with the authenticated user, the controller 36 transfers the sensor information transmitted from the wearable terminal device 20, along with information indicating that the sensor information is valid, to the management server 40.

In analyzing activities, health statuses, and the like of individual users, based on the sensor information transferred from the image forming apparatus 10, the management server 40 performs various types of analysis without using sensor information transferred along with information indicating that the sensor information is not correct sensor information. Therefore, more accurate analysis for each user may be achieved.

Furthermore, in analyzing activities, health statuses, and the like of individual users, based on the sensor information transferred from the image forming apparatus 10, the management server 40 may perform various types of analysis using only valid sensor information that is transferred along with information indicating that wearing of the correct wearable terminal device 20 associated with the user is confirmed.

Next, a functional configuration of the wearable terminal device 20 according to this exemplary embodiment will be explained with reference to a block diagram of FIG. 5.

Figure 5:
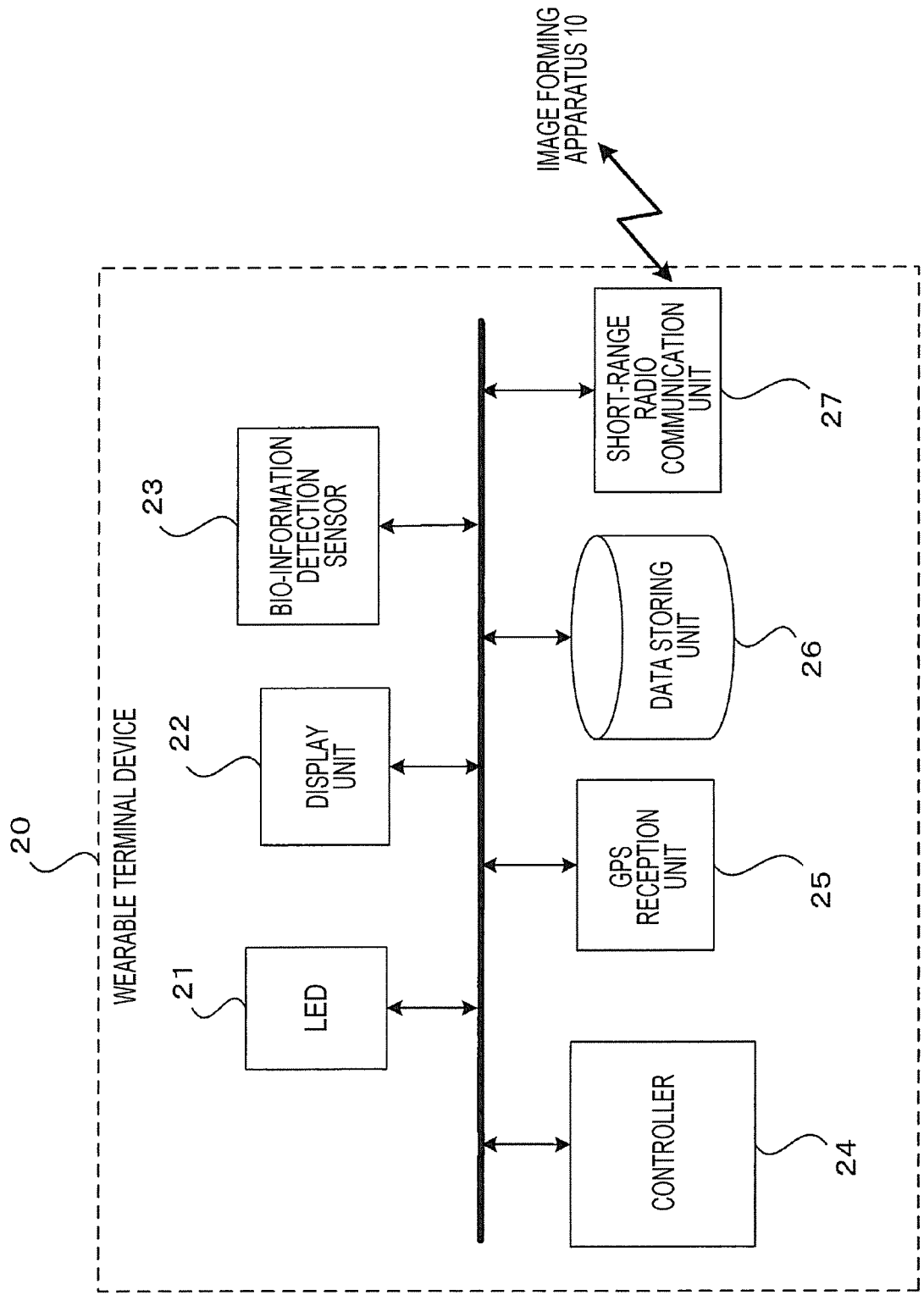
FIG. 5 is a block diagram illustrating a functional configuration of a wearable terminal device according to an exemplary embodiment of the present disclosure.

The wearable terminal device 20 includes, as illustrated in FIG. 5, a light-emitting diode (LED) 21, a display unit 22, a bio-information detection sensor 23, a controller 24, a GPS reception unit 25, a data storing unit 26, and a short-range radio communication unit 27.

The LED 21 is light-emitting means for performing a light-emission action by entering a turned-on or turned-off state, under the control of the controller 24. The light-emitting means may be an element that emits light, like the LED 21 according to this exemplary embodiment or an electroluminescence (EL) element, or a liquid crystal element and a backlight that are combined to provide light emission by causing backlight light to transmit by a shutter action of liquid crystal.

The bio-information detection sensor 23 detects various types of bio-information such as the pulse rate, blood pressure, body temperature, and the like of a user who is wearing the wearable terminal device 20. The GPS reception unit 25 detects positional information of the user.

The data storing unit 26 stores various types of bio-information detected by the bio-information detection sensor 23 and positional information detected by the GPS reception unit 25, along with time information.

The short-range radio communication unit 27 transmits and receives data to and from the image forming apparatus 10 via the BLE communication line. The display unit 22 displays various types of letter information for the user, under the control of the controller 24.

The controller 24 transmits various types of sensor information such as bio-information and positional information stored in the data storing unit 26 to the image forming apparatus 10 via the short-range radio communication unit 27.

Furthermore, the controller 24 performs an action based on an action instructing signal received from the image forming apparatus 10 via the short-range radio communication unit 27. Specifically, the controller 24 performs a light-emission action by turning on or turning off the LED 21, based on a light-emission instructing signal received from the image forming apparatus 10 via the short-range radio communication unit 27.

The light-emission instructing signal includes a terminal ID for identifying the wearable terminal device 20 to which light-emission is instructed. The controller 24 performs a light-emission action based on the received light-emission instructing signal only in a case where the terminal ID included in the light-emission instructing signal and the terminal ID of the device including the controller 24 match.

Figure 6:
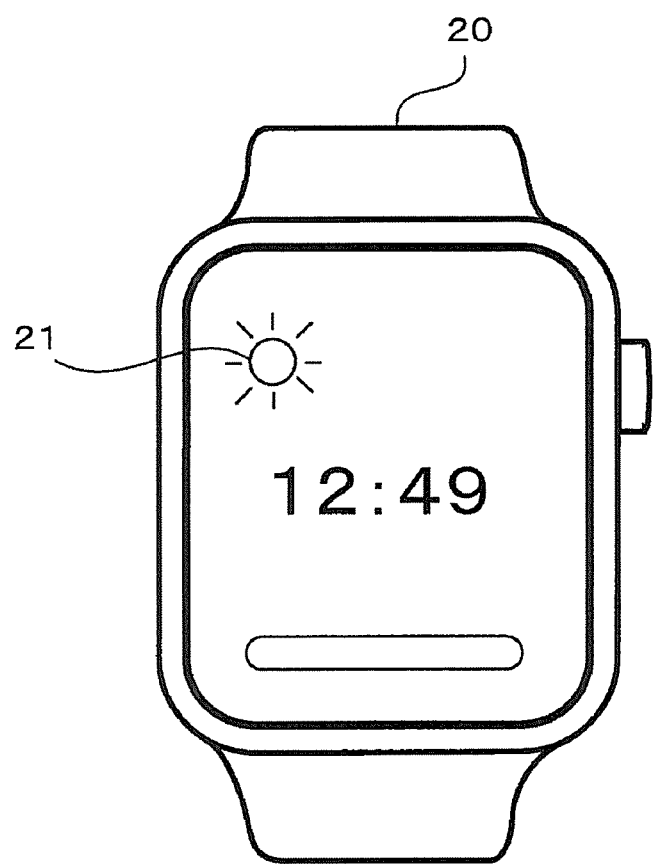
FIG. 6 is a diagram illustrating an external appearance of a wearable terminal device according to an exemplary embodiment of the present disclosure.

FIG. 6 illustrates an external appearance of the wearable terminal device 20 having the configuration described above. The wearable terminal device 20 illustrated in FIG. 6 includes the LED 21 on a part of the display.

Next, an action of the information processing system according to this exemplary embodiment will be explained in detail with reference to drawings.

Figure 7:
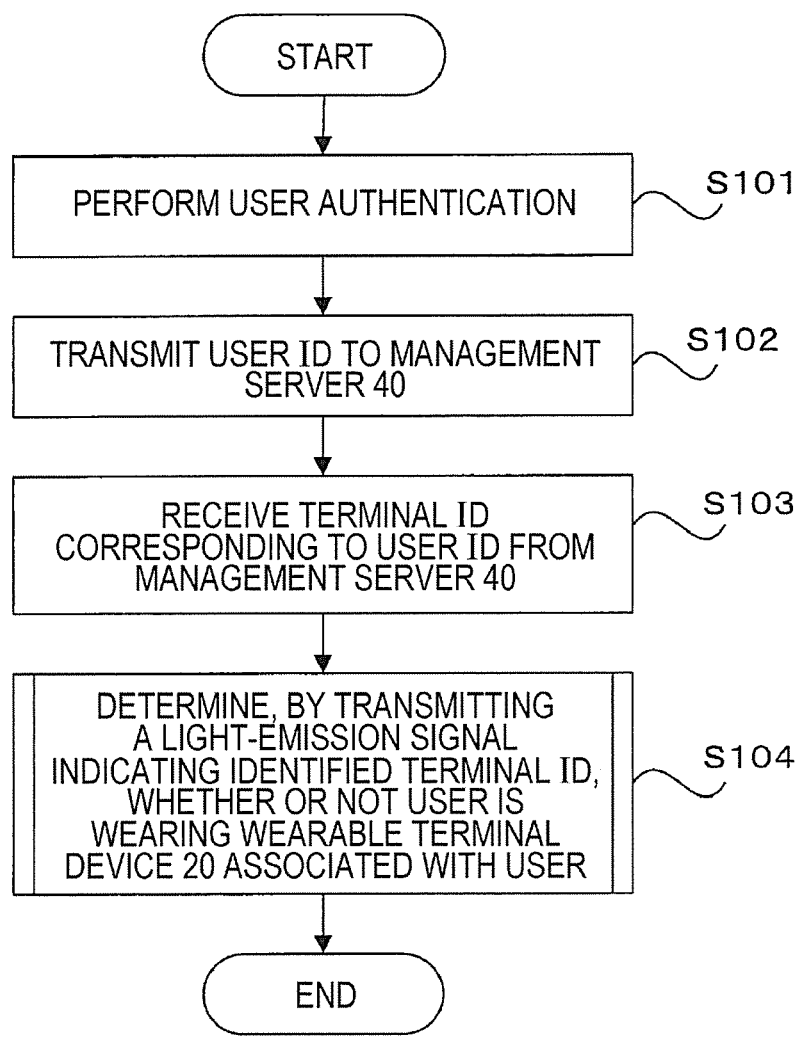
FIG. 7 is a flowchart for explaining an operation of an image forming apparatus according to an exemplary embodiment of the present disclosure.

First, an action of the image forming apparatus 10 according to this exemplary embodiment will be explained with reference to a flowchart of FIG. 7.

In step S101, the image forming apparatus 10 performs authentication of a user who wishes to use the image forming apparatus 10 when the user brings an IC card in which a user ID of the user is stored close to the IC card reader of the image forming apparatus 10.

In step S102, the image forming apparatus 10 transmits the user ID of the authenticated user to the management server 40 via the Internet 30.

Then, in step S103, the image forming apparatus 10 receives a terminal ID corresponding to the user ID from the management server 40.

In step S104, the image forming apparatus 10 performs a determination of whether or not the user is wearing the correct wearable terminal device 20 that is associated with the user, by randomly selecting a light-emission pattern from among a plurality of light-emission patterns and transmitting a light-emission signal indicating the identified terminal ID corresponding to the user ID to the wearable terminal device 20 via the BLE communication line.

Figure 8:
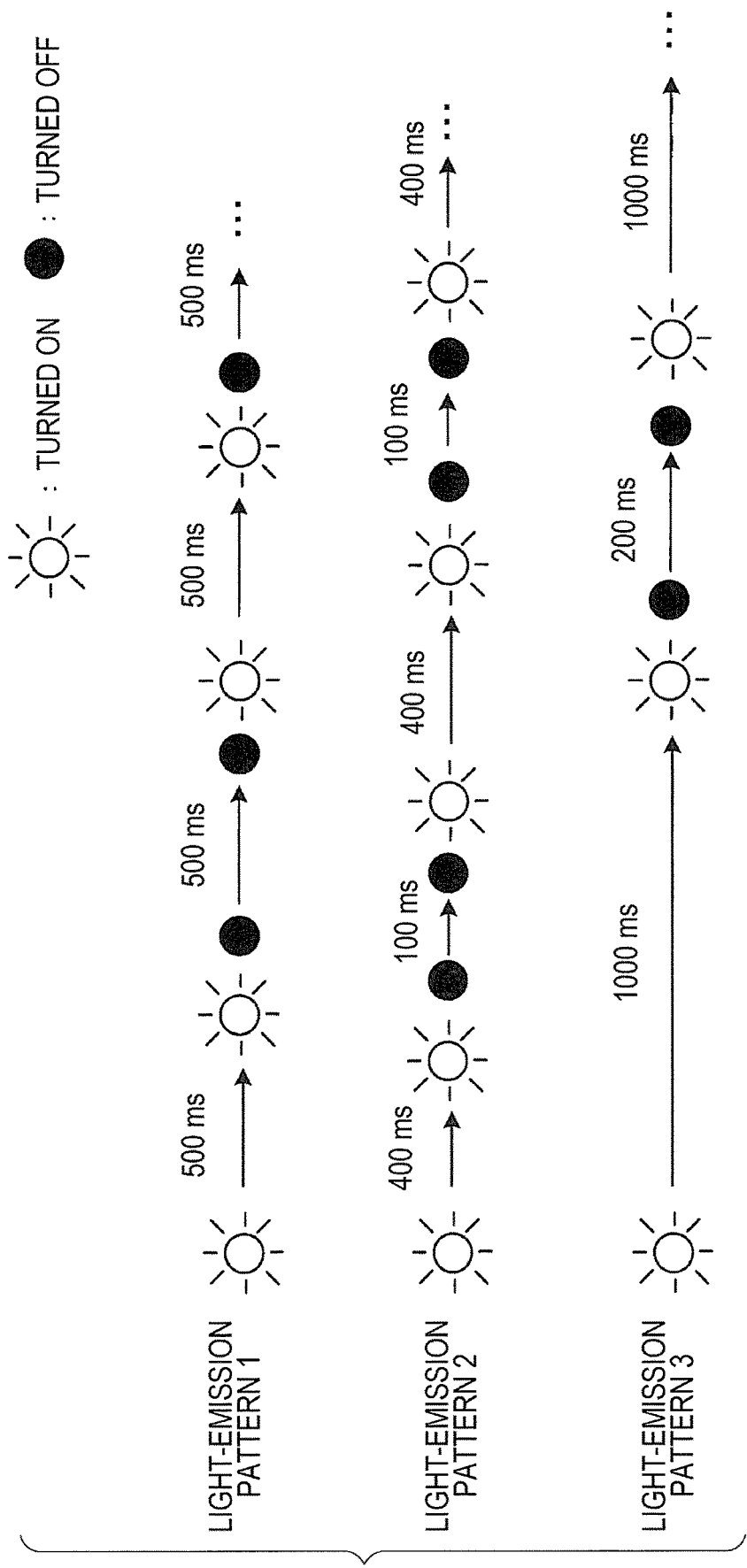
FIG. 8 is a diagram for explaining various light-emission patterns.

FIG. 8 illustrates examples of light-emission patterns. As illustrated in FIG. 8, for example, a light-emission pattern in which turning-on for 500 milliseconds and turning-off for 500 milliseconds are repeated is set as light-emission pattern 1, and a light-emission pattern in which turning-on for 400 milliseconds and turning-off for 100 milliseconds are repeated is set as light-emission pattern 2. In a similar manner, as illustrated FIG. 8, a light-emission pattern in which turning-on for 1,000 milliseconds and turning-off for 200 milliseconds are repeated is set as light-emission pattern 3.

In the image forming apparatus 10, an arbitrary light-emission pattern is randomly selected from among the plurality of light-emission patterns mentioned above. Therefore, it is difficult for a user to predict the present light-emission pattern.

Figure 9:
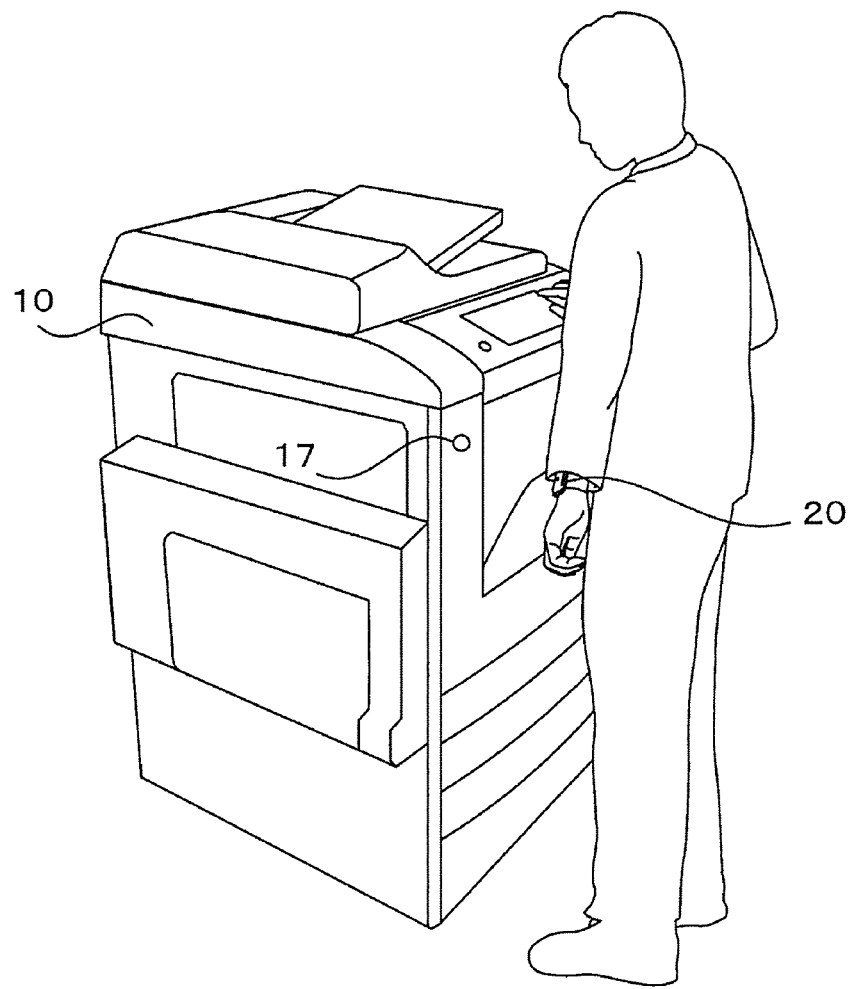
FIG. 9 is a diagram illustrating a state in which a camera installed at the image forming apparatus shoots the wearable terminal device that is worn on an arm of an authenticated user and a light-emission pattern of the LED is detected.

Next, a state in which the camera 17 installed at the image forming apparatus 10 shoots the wearable terminal device 20 that is worn on an arm of an authenticated user and a light-emission pattern of the LED 21 is detected is illustrated in FIG. 9.

As illustrated in FIG. 9, the camera 17 is installed at a position on the left facing the front of the image forming apparatus 10. Therefore, the camera 17 is able to image the wearable terminal device 20 that is being worn on the left hand of a user who is operating an action panel or the like of the image forming apparatus 10 using the right hand, without user's intention.

The camera 17 may be installed on the side of the action panel or the like of the image forming apparatus 10 and the action panel or the like may instruct a user to hold the wearable terminal device 20 over the camera 17, so that the user may intentionally direct the wearable terminal device 20 toward the camera 17 and the wearable terminal device 20 may thus be shot.

Figure 10:
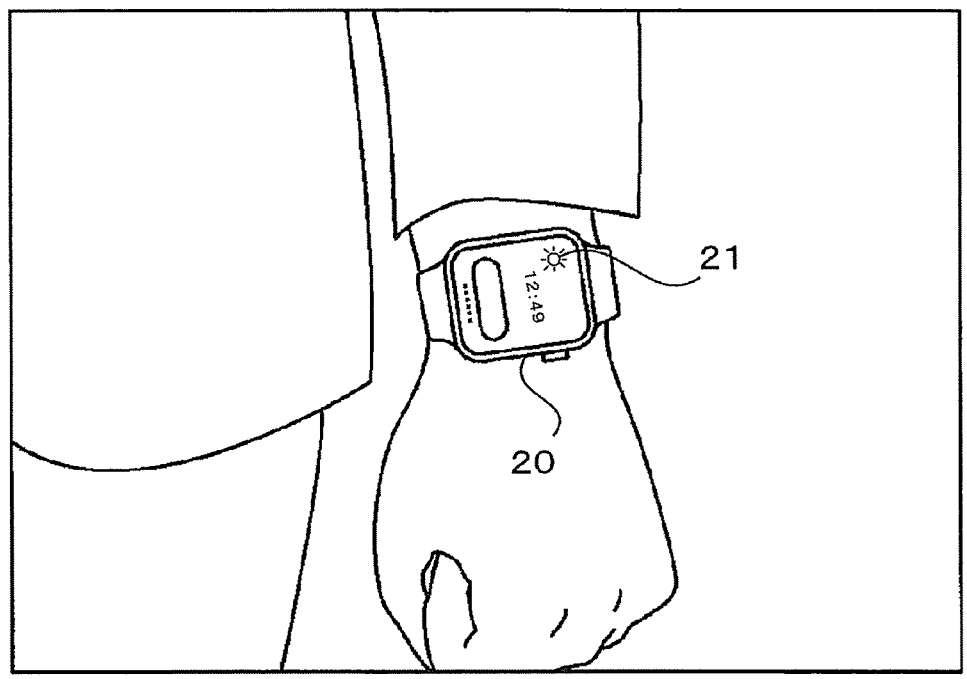
FIG. 10 is a diagram illustrating an example of a photographed image in the case where the wearable terminal device that is worn on an arm of a user who is in the vicinity of the image forming apparatus is shot by the camera.

An example of a photographed image in the case where the wearable terminal device 20 that is worn on an arm of a user who is in the vicinity of the image forming apparatus 10 is shot by the camera 17 is illustrated in FIG. 10. In this example, the light-emission pattern of the LED 21 of the wearable terminal device 20 is shot. Therefore, a moving image of the wearable terminal device 20 is shot by the camera 17.

Figure 11:
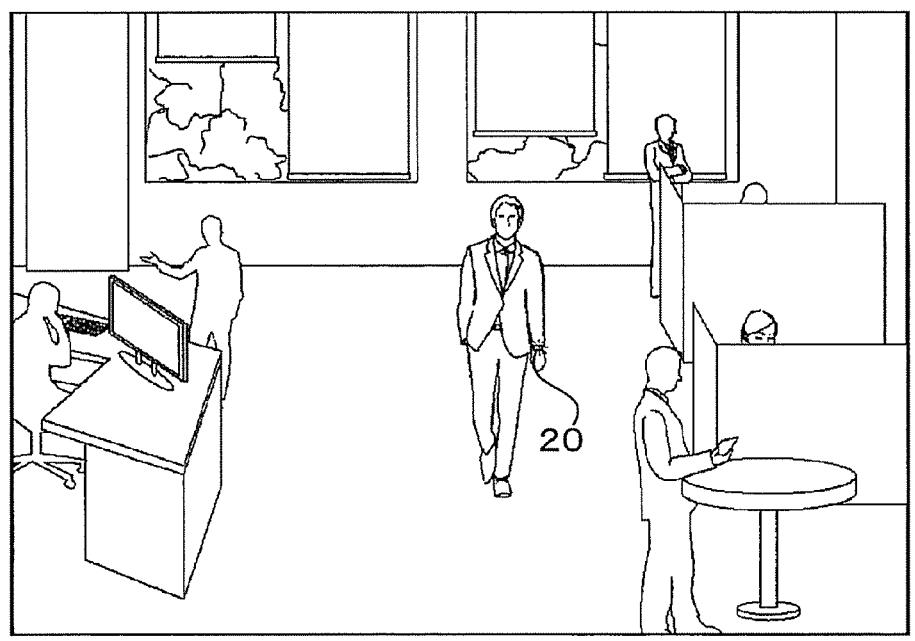
FIG. 11 is a diagram illustrating an example of a photographed image in the case where the wearable terminal device that is worn on an arm of a user who is located a little away from the image forming apparatus is shot by the camera.

Furthermore, an example of a photographed image in the case where the wearable terminal device 20 that is worn on an arm of a user who is located a little away from the image forming apparatus 10 is shot is illustrated in FIG. 11.

In the image example illustrated in FIG. 11, the case where an image of a user who is distant from the image forming apparatus 10 and the wearable terminal device 20 that is worn on an arm of the user is shot is illustrated. With reference to this image example, even in the case where the wearable terminal device 20 is worn on the arm of the user who is distant from the image forming apparatus 10, light emission of the wearable terminal device 20 is obtained.

Figure 12:
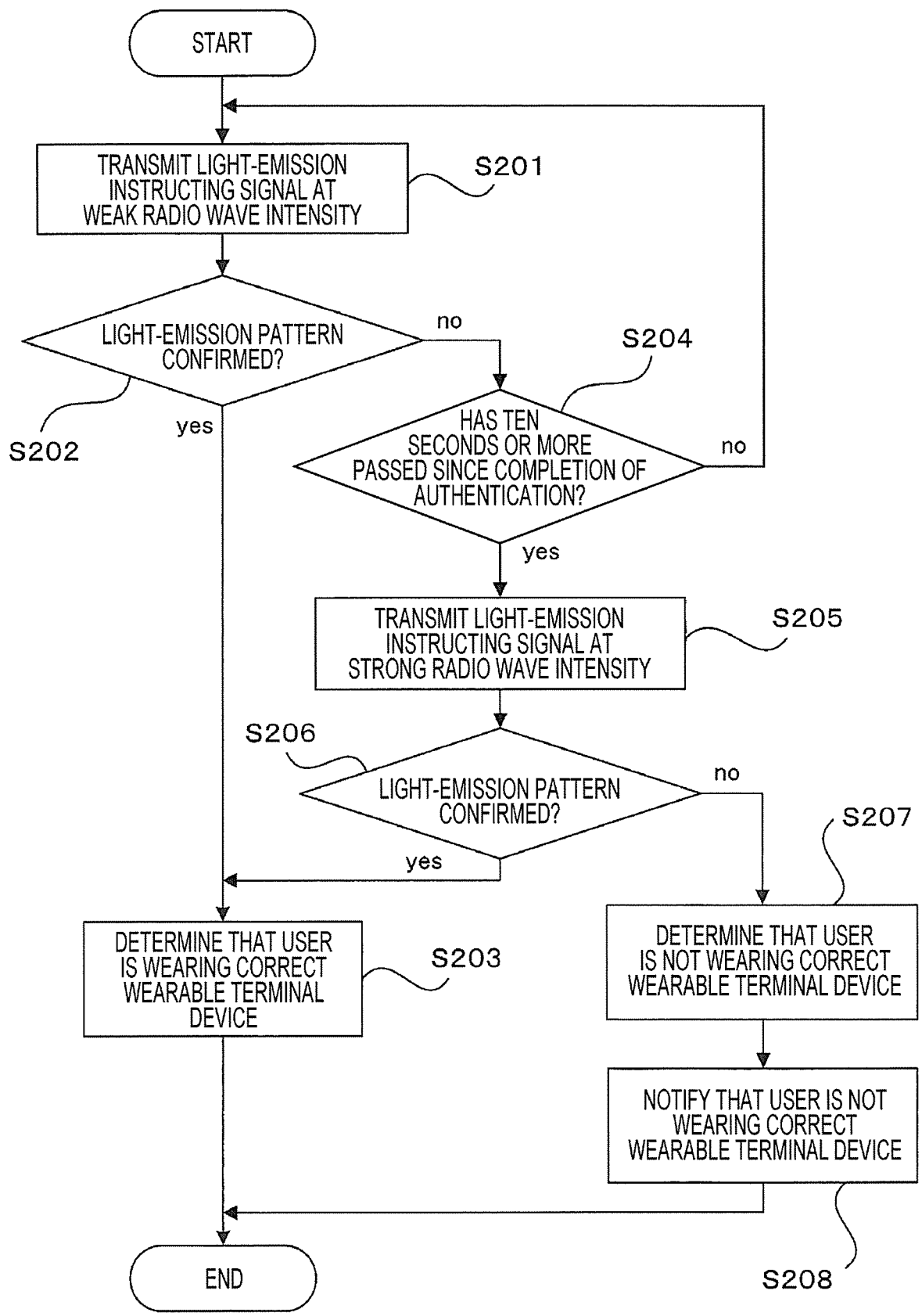
FIG. 12 is a flowchart for explaining the details of a determination process in step S104 of the flowchart in FIG. 7 as to whether or not the user is wearing the wearable terminal device that is associated with the user.

Next, the details of the determination process in step S104 of the flowchart in FIG. 7 as to whether or not the user is wearing the wearable terminal device 20 that is associated with the user will be explained with reference to a flowchart of FIG. 12.

First, in step S201, the image forming apparatus 10 transmits a light-emission instructing signal at a weak radio wave output intensity to the wearable terminal device 20.

In step S202, the image forming apparatus 10 determines whether or not the same light-emission pattern as that instructed by the light-emission instructing signal is obtained in a moving image shot by the camera 17.

In the case where the user is correctly wearing the wearable terminal device 20 with the terminal ID associated with the user ID of the user, the LED 21 of the wearable terminal device 20 that is being worn on an arm of the user emits light in the instructed light-emission pattern, based on a light-emission instructing signal transmitted from the image forming apparatus 10.

Thus, in the case where the same light-emission pattern as that instructed by the light-emission instructing signal is obtained in the moving image shot by the camera 17 in step S202, the image forming apparatus 10 determines in step S203 that the user is wearing the correct wearable terminal device 20.

In the case where the same light-emission pattern as that instructed by the light-emission instructing signal is not obtained in the moving image shot by the camera 17 in step S202, the image forming apparatus 10 determines in step S204 whether or not a preset time, for example, ten seconds, or more has passed since completion of authentication.

In the case where it is determined in step S204 that, for example, ten seconds or more has not passed since completion of authentication, the image forming apparatus 10 repeats the processing of steps S201 and S202, in which a light-emission instructing signal is transmitted at a weak radio wave output intensity and determines whether or not the same light-emission pattern as that instructed by the light-emission instructing signal is obtained.

In the case where it is determined in step S204 that, for example, ten seconds or more has passed since completion of authentication, the image forming apparatus 10 transmits a light-emission instructing signal at a strong radio wave output intensity to the wearable terminal device 20 in step S205.

In step S206, the image forming apparatus 10 determines whether or not the same light-emission pattern as that instructed by the light-emission instructing signal is obtained in a moving image shot by the camera 17.

In the case where the same light-emission pattern as that instructed by the light-emission instructing signal is obtained in the moving image shot by the camera 17 in step S206, the image forming apparatus 10 determines in step S203 that the user is wearing the correct wearable terminal device 20.

In the case where the same light-emission pattern as that instructed by the light-emission instructing signal is not obtained in the moving image shot by the camera 17 in step S206, the image forming apparatus 10 determines in step S207 that the user is not wearing the correct wearable terminal device 20.

In step S208, the image forming apparatus 10 notifies that the user is not wearing the correct wearable terminal device 20, for example, by displaying, on the action panel 41, information indicating that the user is not wearing the correct wearable terminal device 20.

Figure 13:
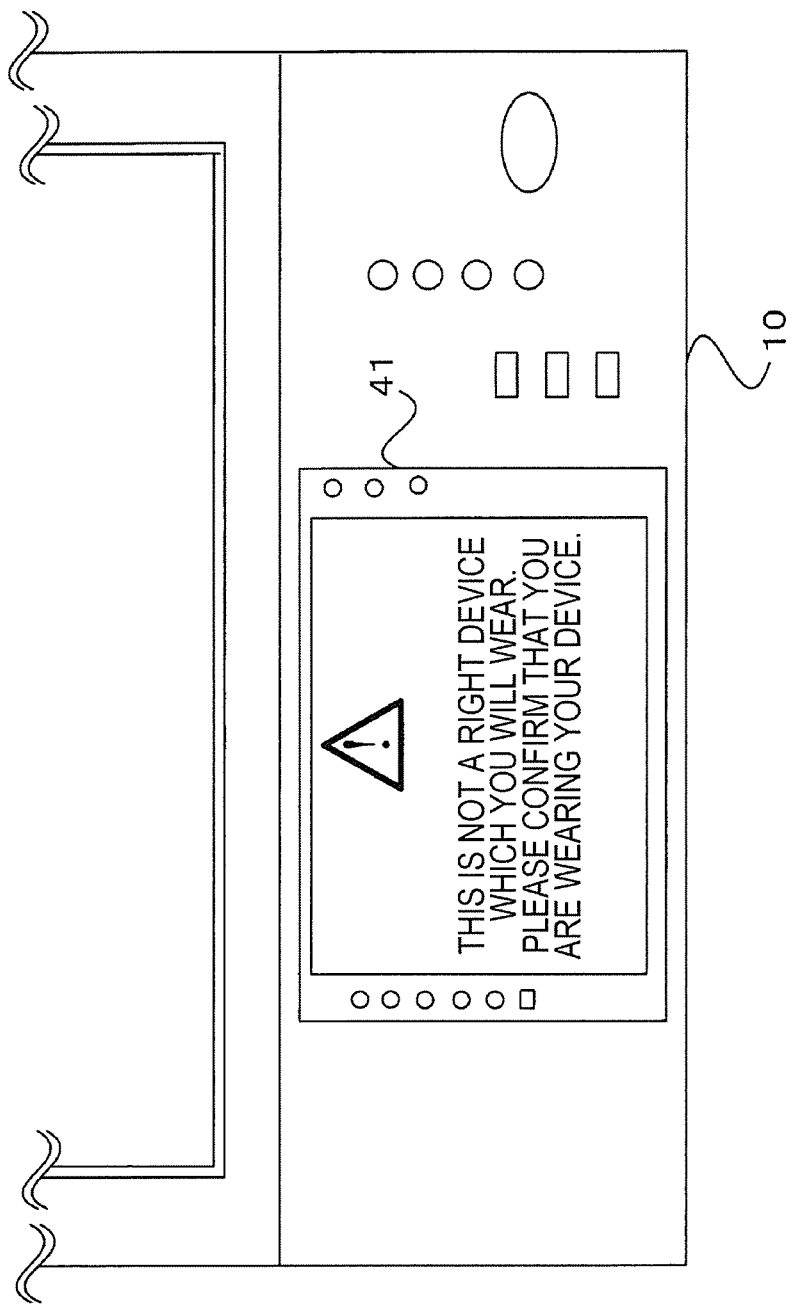
FIG. 13 is a diagram illustrating an example of a case where information indicating that the user is not wearing the correct wearable terminal device is displayed on an action panel of the image forming apparatus.

FIG. 13 illustrates an example of a case where information indicating that the user is not wearing the correct wearable terminal device 20 is displayed on the action panel 41 as described above. As illustrated in FIG. 13, letters "Are you sure that the wearable terminal device you are wearing is not someone else's device? Please confirm that you are wearing your device." are displayed on the action panel 41, and contents for prompting the user to confirm that the wearable terminal device 20 being worn by the user is the correct wearable terminal device 20 that is supposed to be worn by the user are thus displayed.

Next, a reason for transmitting light-emission instructing signals at different radio wave output intensities will be explained with reference to FIGS. 14 and 15.

Figure 14:
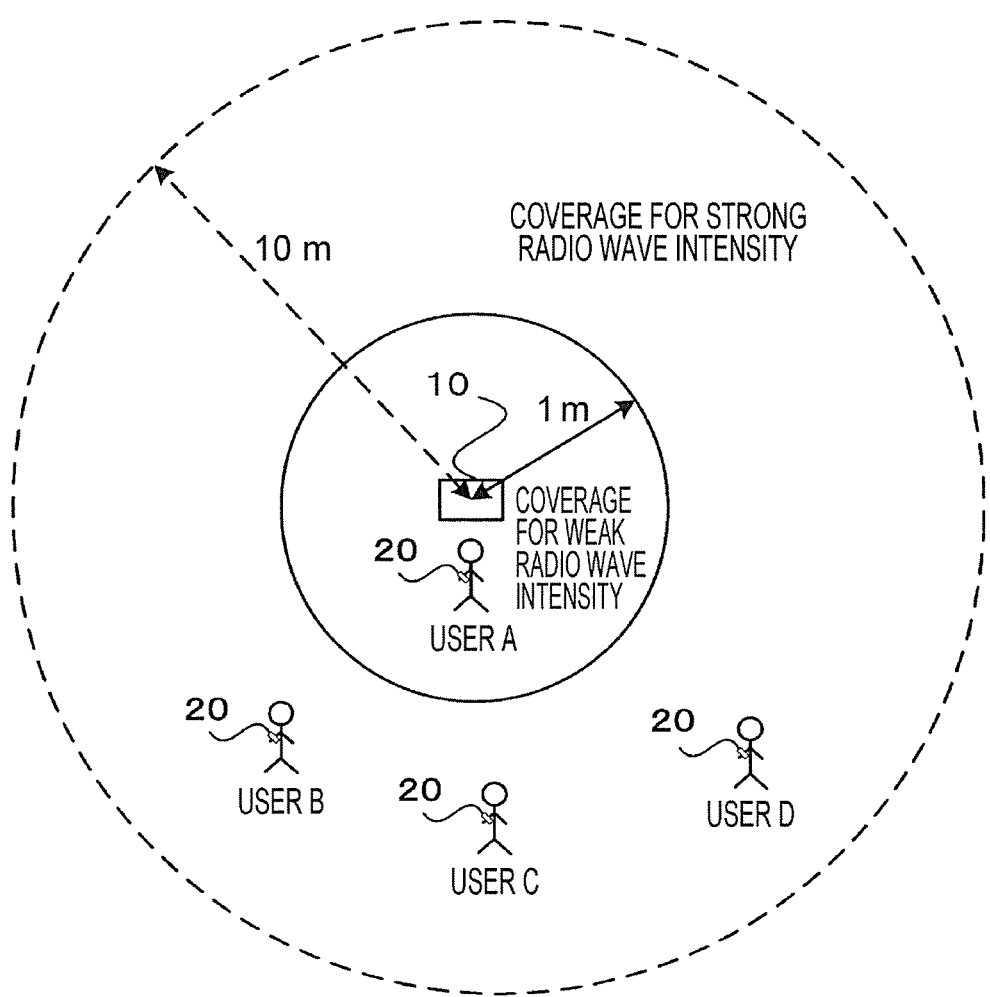
FIG. 14 is a diagram for explaining a reason for transmitting light-emission instructing signals at different radio wave output intensities.
Figure 15:
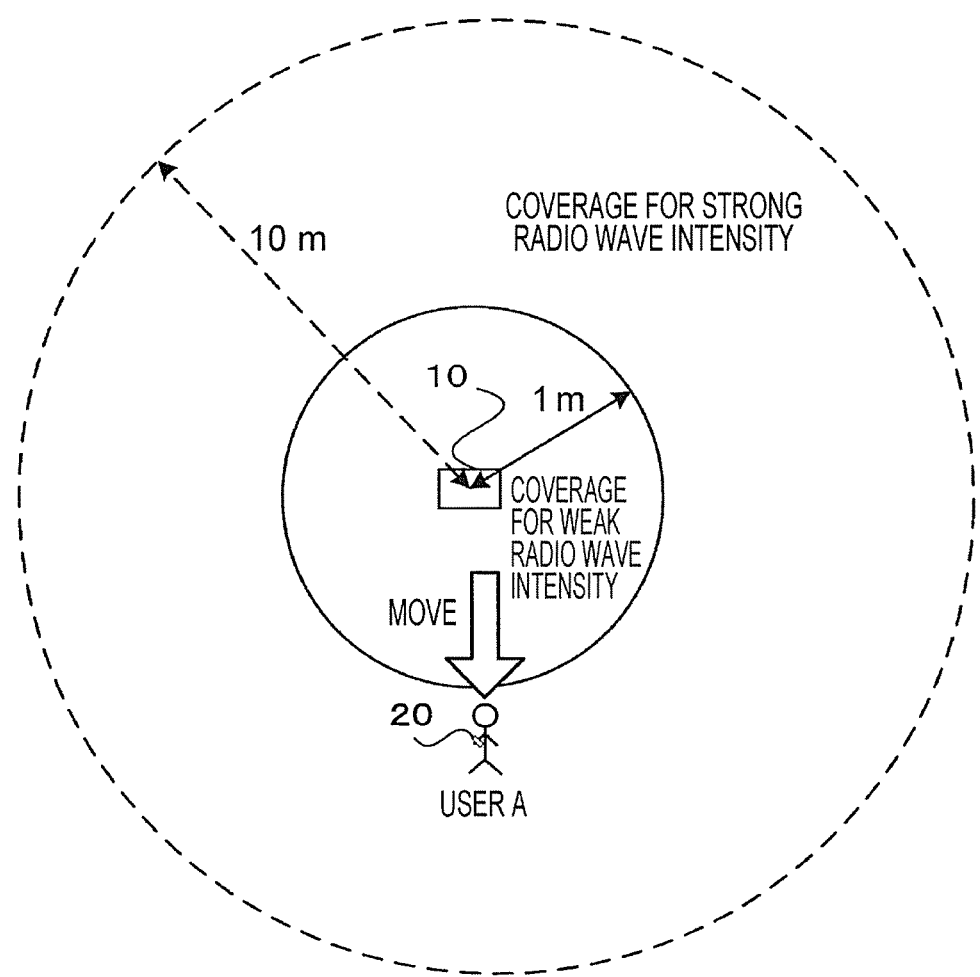
FIG. 15 is a diagram for explaining a reason for transmitting light-emission instructing signals at different radio wave output intensities.

In FIGS. 14 and 15, for example, in the case where a light-emission instructing signal is transmitted at a weak radio wave output intensity, the light-emission instructing signal reaches the wearable terminal device 20 at a distance of one meter or less from the image forming apparatus 10, and in the case where a light-emission instructing signal is transmitted at a strong radio wave output intensity, the light-emission instructing signal reaches the wearable terminal device 20 at a distance of ten meters or less from the image forming apparatus 10.

In FIG. 14, a state in which user A who is wearing the wearable terminal device 20 is located within one meter from the image forming apparatus 10 and users B to D who are wearing the wearable terminal devices 20 are located within ten meters from the image forming apparatus 10 is illustrated.

In the case where a light-emission instructing signal is transmitted at a strong radio wave output intensity in the state illustrated in FIG. 14, the light-emission instructing signal reaches all the wearable terminal devices 20 that are worn by the users A to D. In the case where the wearable terminal device 20 that is supposed to be worn by the user A is worn by the user C, if the user C is included in an image shot by the camera 17 of the image forming apparatus 10, the image forming apparatus 10 may obtain an incorrect determination result. That is, the image forming apparatus 10 incorrectly determines that the authenticated user A is wearing the correct wearable terminal device 20 that is associated with the user A.

However, in the case where the image forming apparatus 10 transmits a light-emission instructing signal only at a weak radio wave output intensity, the light-emission instructing signal does not reach the wearable terminal device 20 of the user A who is one or more meters away from the image forming apparatus 10, as illustrated in FIG. 15. Therefore, a wearing determination for the wearable terminal device 20 may not be performed.

Due to the reason described above, the image forming apparatus 10 according to this exemplary embodiment transmits light-emission instructing signals at different radio wave output intensities to the wearable terminal device 20, so that wearing determinations supporting various states may be performed.

Finally, a state in which data transmission and reception among the wearable terminal device 20, the image forming apparatus 10, and the management server 40 described above is illustrated in a sequence chart of FIG. 16.

First, in step S301, the image forming apparatus 10 performs user authentication. In step S302, the image forming apparatus 10 transmits a user ID of the authenticated user to the management server 40.

In step S303, the management server 40 transmits a terminal ID corresponding to the transmitted user ID to the image forming apparatus 10.

In step S304, the image forming apparatus 10 selects a light-emission pattern. In step S305, the image forming apparatus 10 transmits a light-emission instructing signal for issuing an instruction to implement the selected light-emission pattern to the wearable terminal device 20 whose terminal ID is identified by the management server 40.

In step S306, the wearable terminal device 20 that has received the light-emission instructing signal from the image forming apparatus 10 performs a light-emission action in the light-emission pattern based on the received light-emission instructing signal.

In step S307, the image forming apparatus 10 shoots, with the camera 17, a moving image of a light-emission action of the wearable terminal device 20.

Next, in step S308, the image forming apparatus 10 determines whether or not the light-emission pattern of the transmitted light-emission instructing signal and the light-emission pattern of the wearable terminal device 20 in the shot moving image match.

In step S309, the image forming apparatus 10 performs a wearing determination for determining, based on a result of the determination as to whether or not the light-emission patterns match, whether or not the wearable terminal device 20 that is being worn by the user is the device associated with the user.

The image forming apparatus 10 according to this exemplary embodiment performs the processing of steps S305 to S309 a plurality of times at different radio wave output intensities to determine whether or not the authenticated user is wearing the wearable terminal device 20 that is associated with the authenticated user.

In the foregoing exemplary embodiment, by confirming, with the camera 17, whether or not the wearable terminal device 20 emits light in a specific light-emission pattern, it is determined whether or not an authenticated user is wearing the correct wearable terminal device 20.

However, by causing the wearable terminal device 20 to display a specific authentication number and prompting the user to input the displayed authentication number, it may be determined whether or not the authenticated user is wearing the correct wearable terminal device 20, without using a camera.

Furthermore, by displaying code information that is not able to be deciphered by human sight such as QR Code®, instead of the authentication number, on the display of the wearable terminal device 20, and shooting the code information by the camera 17 of the image forming apparatus 10, it may be determined whether or not the displayed code information and the shot code information match to perform a wearing determination for the wearable terminal device 20.

[Modifications]

In the foregoing exemplary embodiment, the case where the determination as to whether or not a user is wearing the correct wearable terminal device 20 that is supposed to be worn by the user is performed is explained. However, the present disclosure is not limited to the configuration described above. The present disclosure may be applied in a similar manner to any portable device that includes a radio communication function and a function for emitting light in accordance with a light-emission instructing signal from the image forming apparatus 10 and is able to be held by the user.

The present disclosure is also applicable in a similar manner to a case where, for example, the portable device is embedded in a nameplate or uniform and it is thus determined whether or not the user is holding the portable device that is supposed to be held by the user or an object in which the portable device is embedded, such as whether or not the user is wearing the nameplate that is supposed to be worn by the user or whether or not the user is wearing the supplied his/her uniform.

Furthermore, in the foregoing exemplary embodiment, the case where the image forming apparatus 10 transfers sensor information acquired from the wearable terminal device 20 to the management server 40 is explained. However, the present disclosure is not limit to this configuration. The present disclosure may be applied in a similar manner to an information processing apparatus different from the image forming apparatus 10 as long as the information processing apparatus performs authentication of a user who wishes to use the information processing apparatus.

The present disclosure is also applicable in a similar manner to a case where an apparatus that performs authentication of a user who wishes to use the apparatus, such as an automatic teller machine (ATM) apparatus that performs authentication of a user who wishes to deposit or withdraw cash, a ticket gate of public transport such as a train, a bus, or the like, an automobile that performs authentication of a driver who wishes to drive, an authentication apparatus that performs authentication of a visitor to an apartment, a building, a hall, or a room, a terminal apparatus that is individually owned, such as a personal computer, a smartphone, or the like, and performs user authentication, determines whether or not the user is holding a correct portable device or a portable object that is associated with the user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a hardware processor, executing a control program stored in a memory to be configured to:
authenticate a user by using user identification;
receive a terminal identification of a first portable device that is associated to the user in advance after the user is authenticated;
transmit an action instructing signal for issuing an instruction to perform an action to a portable device at a plurality of radio wave output intensities selectively, via wireless communication, wherein the action instructing signal is generated based on the terminal identification of the first portable device;
detect a change of a status of the portable device through a moving image capturing the change of the status of the portable device, wherein the change of the status of the portable device is detected in response to the action instructing signal transmitted at a first radio wave output intensity selected among the plurality of radio wave output intensities to the portable device;
transmit the action instructing signal by selecting a second radio wave output intensity among the plurality of radio wave output intensities and different from the first radio wave output intensity to the portable device when the change of the status of the portable device is not detected in response to the action instructing signal transmitted at the first radio wave output intensity; and
determine, when the action instruction signal is transmitted at the first wave output intensity or the second radio wave output intensity and based on the detected change of the status of the portable device corresponds to the action instructed by the action instruction signal, whether or not the user is holding the first portable device that is associated with the user in advance.

2. The info illation processing apparatus according to claim 1, the processor being further configured to:
identify the terminal identification of a first portable device,
wherein the processor is configured to transmit the action instructing signal for issuing the instruction to perform the action to the portable device with the terminal identification information.

3. The information processing apparatus according to claim 1,
wherein the second radio wave output intensity is stronger than the first radio wave output intensity.

4. The information processing apparatus according to claim 2,
wherein the second radio wave output intensity is stronger than the first radio wave output intensity.

5. The information processing apparatus according to claim 1,
wherein the second radio wave output intensity is stronger than the first radio wave output intensity, and the processor is configured to transmit the action instructing signal at the second radio wave output after the change of the status of the portable device in response the action instructing signal that is transmitted at the first radio wave output has not being detected for an elapse of a preset time starting from the processor authenticated the user.

6. The information processing apparatus according to claim 2,
wherein the second radio wave output intensity is stronger than the first radio wave output intensity, and the processor is configured to transmit the action instructing signal at the second radio wave output after the change of the status of the portable device in response the action instructing signal that is transmitted at the first radio wave output has not being detected for an elapse of a preset time starting from the processor authenticated the user.

7. The information processing apparatus according to claim 1,
wherein the second radio wave output intensity is weaker than the first radio wave output intensity.

8. The information processing apparatus according to claim 2,
wherein the second radio wave output intensity is weaker than the first radio wave output intensity.

9. The information processing apparatus according to claim 1,
wherein the action instructing signal instructs the portable device to cause a visual change, and
wherein the processor is configured to detect the visual change of the portable device as the change of the status.

10. The information processing apparatus according to claim 9,
wherein the action instructing signal instructs the portable device to emit light, and
wherein the processor is configured to shoot an image including the portable device to detect light emission of the portable device.

11. The information processing apparatus according to claim 9, the processor being further configured to:
obtain an action from the user,
wherein the action instructing signal displays letter information on a display of the portable device, and
wherein the processor is configured to detect the change of the status of the portable device in accordance with the letter information obtained by the processor.

12. The information processing apparatus according to claim 1, the processor being further configured to:
obtain an action from the user,
wherein the processor is configured to detect the change of the status of the portable device in accordance with the action of the user obtained by the processor.

13. The information processing apparatus according to claim 1, the processor being further configured to:
notify, in a case where the processor determines that the user is not holding the first portable device that is associated to the user in advance, a predetermined notification destination that the user is not holding the first portable device.

14. The information processing apparatus according to claim 1,
wherein the portable device includes a sensor that detects bio-information of the user while the user is wearing the portable device, and
wherein the processor is configured to detect the change of the status in accordance with the bio-information of the user.

15. The information processing apparatus according to claim 1,
wherein the portable device includes a sensor that detects positional information of the user while the user is wearing the portable device, and
wherein the processor is configured to detect the change of the status in accordance with the positional information of the user.

16. A non-transitory computer readable medium storing a program causing a computer to execute a process for information processing, the process comprising:
authenticating a user by using user identification;
receive a terminal identification of a first portable device that is associated to the user in advance after the user is authenticated;
transmitting an action instructing signal for issuing an instruction to perform an action to a portable device at a plurality of radio wave output intensities selectively, via wireless communication, wherein the action instructing signal is generated based on the terminal identification of the first portable device;
detecting a change of a status of the portable device through a moving image capturing the change of the status of the portable device, wherein the change of the status of the portable device is detected in response to the action instructing signal transmitted at a first radio wave output intensity selected among the plurality of radio wave output intensities to the portable device;
transmitting the action instructing signal by selecting a second radio wave output intensity among the plurality of radio wave output intensities and different from the first radio wave output intensity to the portable device when the change of the status of the portable device is not detected in response to the action instructing signal transmitted at the first radio wave output intensity; and
determining, when the action instruction signal is transmitted at the first wave output intensity or the second radio wave output intensity and based on the change of the status of the portable device corresponds to the action instructed by the action instruction signal, whether or not the user is holding the first portable device that is associated with the user in advance.

17. A method for information processing comprising:
authenticating a user by using user identification;
receive a terminal identification of a first portable device that is associated to the user in advance after the user is authenticated;
transmitting an action instructing signal for issuing an instruction to perform an action to a portable device at a plurality of radio wave output intensities selectively, via wireless communication, wherein the action instructing signal is generated based on the terminal identification of the first portable device;
detecting a change of a status of the portable device through a moving image capturing the change of the status of the portable device, wherein the change of the status of the portable device is detected in response to the action instructing signal transmitted at a first radio wave output intensity selected among the plurality of radio wave output intensities to the portable device;

transmitting the action instructing signal by selecting a second radio wave output intensity among the plurality of radio wave output intensities and different from the first radio wave output intensity to the portable device when the change of the status of the portable device is not detected in response to the action instructing signal transmitted at the first radio wave output intensity; and determining, when the action instruction signal is transmitted at the first wave output intensity or the second radio wave output intensity and based on the detected change of the status of the portable device corresponds to the action instructed by the action instruction signal, whether or not the user is holding the first portable device that is associated with the user in advance.

* * * * *